United States Patent
Goossens et al.

[11] Patent Number: 5,722,633
[45] Date of Patent: Mar. 3, 1998

[54] SOLENOID VALVE FOR SLIP CONTROLLED BRAKE SYSTEMS

[75] Inventors: Andre F. L. Goossens, Rumst; Marc Timmermans, Leerbeek, both of Belgium; Hans Wupper, Friedrichsdorf/Ts, Germany

[73] Assignee: ITT Automotive Europe GmbH, Germany

[21] Appl. No.: 663,077

[22] PCT Filed: Nov. 11, 1994

[86] PCT No.: PCT/EP94/03734

§ 371 Date: Aug. 12, 1996

§ 102(e) Date: Aug. 12, 1996

[87] PCT Pub. No.: WO95/18030

PCT Pub. Date: Jul. 6, 1995

[30] Foreign Application Priority Data

Dec. 24, 1993 [DE] Germany ............... 43 44 440.7

[51] Int. Cl.[6] ............................................. F16K 31/06
[52] U.S. Cl. .......................... 251/129.15; 251/48; 251/50; 335/261; 335/279; 303/119.2
[58] Field of Search ............... 251/129.01, 129.15, 251/48, 50, 51; 335/261, 279, 239, 240; 303/119.2

[56] References Cited

U.S. PATENT DOCUMENTS

| 4,896,127 | 1/1990 | Hida | 335/239 |
| 5,018,431 | 5/1991 | Gray et al. | |
| 5,208,570 | 5/1993 | Nippert | 335/261 |
| 5,582,469 | 12/1996 | Jürgen | 303/119.2 |
| 5,601,275 | 2/1997 | Hironaka | 251/129.15 |

FOREIGN PATENT DOCUMENTS

| 0289337A2 | 11/1988 | European Pat. Off. |
| 0411469A1 | 2/1991 | European Pat. Off. |
| 3132396A1 | 3/1983 | Germany |
| 3529134A1 | 2/1987 | Germany |
| 4037824A1 | 7/1991 | Germany |
| 293782A5 | 9/1991 | Germany |
| 4035817A1 | 5/1992 | Germany |
| 411292A1 | 10/1992 | Germany |
| 4133536A1 | 4/1993 | Germany |
| 4137123A1 | 5/1993 | Germany |
| 2062183 | 5/1981 | United Kingdom |

OTHER PUBLICATIONS

German Search Report, Publication/Application No. P4344440.7.

PCT International Application Cover –English Language Abstract of Japanese Language Abstract WO 94/10487 (Nov. 5, 1994).

PCT International Application Registration Filed Nov. 11, 1994 No. PCT/EP94/03734.

PCT Notification of Receipt of Record Copy, No. PCT/EP94/03734 Aug. 12 1994.

PCT Written Opinion, No. PCT/EP94/03734 (Mailed Jul. 3, 1996).

PCT Notice of Transmittal of International Search Report.
PCT Patent Publication WO92/16397; Oct 1, 1992.
PCT Patent Publication WO93/08051; Apr. 29, 1993.
PCT Notification of Transmittal of Copies of Translation of the International Preliminary Examination Report. (PCT/EP94/0374).

*Primary Examiner*—Kevin Lee

[57] ABSTRACT

A sealing element is fitted between the outside periphery of the magnet armature and the inside periphery of the valve housing and, parallel to the sealing element, an orifice is fitted in the armature, thereby establishing a permanent pressure fluid connection between the pressure fluid chamber disposed inside the magnet armature and the pressure fluid chamber disposed outside the armature.

9 Claims, 1 Drawing Sheet

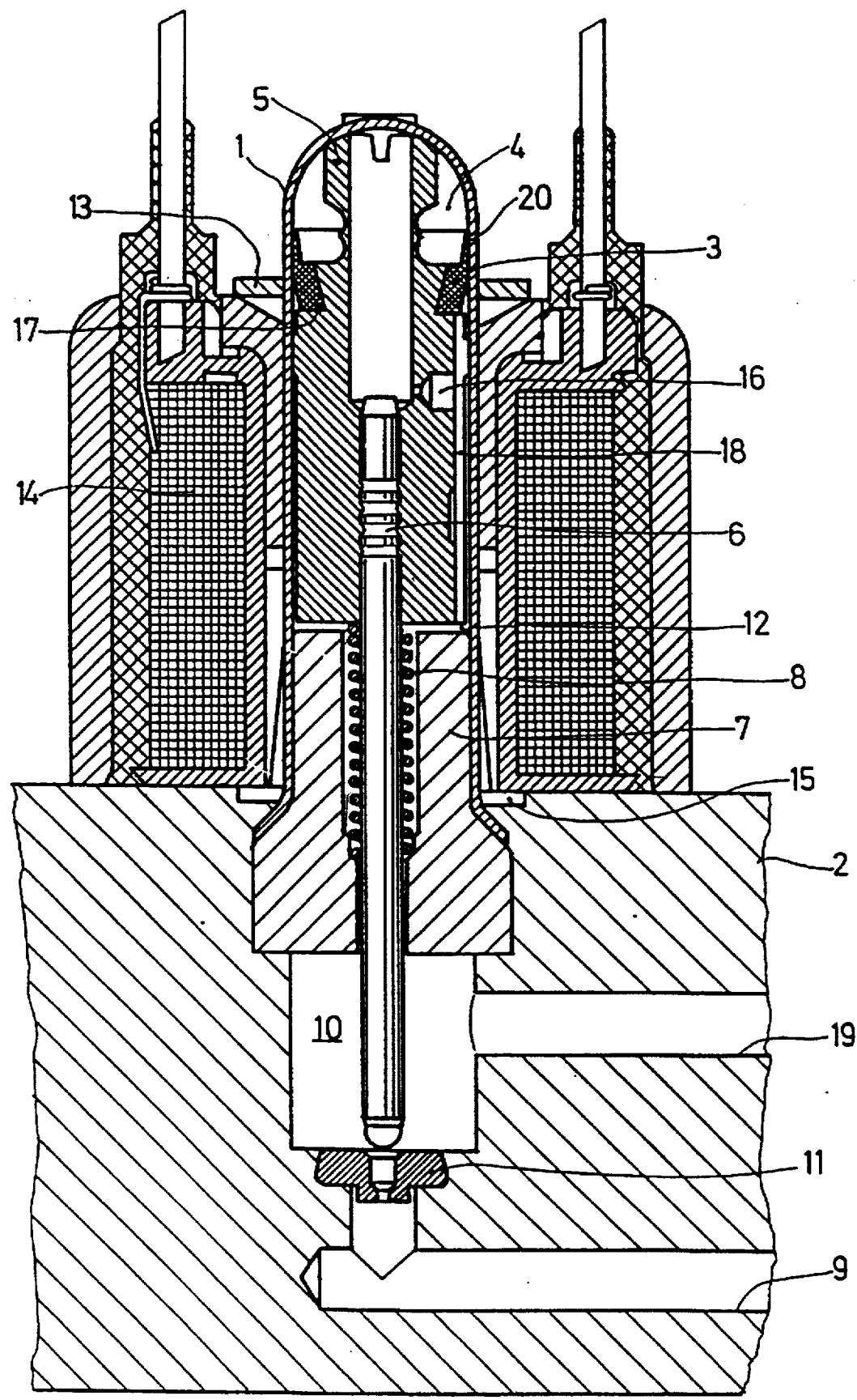

SOLENOID VALVE FOR SLIP CONTROLLED BRAKE SYSTEMS

FIELD OF THE INVENTION

The present invention relates to solenoid valves, and more particularly to solenoid valves for slip-controlled brake systems of automotive vehicles.

BACKGROUND OF THE INVENTION

In a solenoid valve of the type disclosed in German patent application 35 29 124, the stop noises produced by transition of the armature into the one or the other end position are dampened by a hydraulic damper piston arranged on the magnet armature and subdividing a damper chamber in the valve housing into two compartments. The damper piston operates in two directions of movement provided that pressure fluid from one compartment can flow in a throttled manner into the other compartment through the annular slot at the damper piston. In addition, the application discloses arranging a non-return valve in the damper piston which, in response to its opening direction, influences in a defined manner the dampening in the one or the other direction of movement of the armature. Hydraulic dampening of this type is responsive to viscosity so that the valve operating times and switching noises vary with changes in temperature or upon application of the valve for different operating media. Further, the sophisticated construction of the valve is inappropriately costly in practical operations.

German patent application 40 35 817 discloses a solenoid valve. The valve has a longitudinally movable valve closure member which interacts with a valve seat in a valve chamber filled with pressure fluid. The stem of the valve closure member penetrates a coaxially extending bore portion of a guide member, the bore portion being enlarged towards the valve seat. On the side of the valve seat, the valve closure member carries an element, for example, an annular spacer, which closes the enlarged bore portion of the guide member at least approximately. A throttling non-return valve is provided hereby which, in the one direction of movement of the valve closure member, at least hinders the discharge of pressure fluid from the enlarged bore portion, but which releases the delivery of pressure fluid into the enlarged bore portion in the other direction of movement.

SUMMARY OF THE INVENTION

An object of the present invention is to simplify the construction of the solenoid valve disclosed in the previously mentioned prior art so that uniform valve operating times are achieved irrespective of viscosity variations and the noises produced during operation of the solenoid valve are dampened to a lowest possible constant level.

In this design, the movement of the magnet armature is dampened hydraulically by the pressure fluid volume compressed in the pressure fluid chamber inside the magnet armature and, subject to friction, is dampened direction-responsively by the sealing element pressed against the valve housing. The result is that valve noises are minimized above all during the opening movement of the valve closure member. The effect of the sealing element and the diaphragm can be chosen such that a disadvantageous delay in switching the solenoid valve will not occur. Rather, the volumetric flow inside the solenoid valve can be finely adjusted by the dampened opening movement of the closure member until the magnet armature abuts on the valve housing in the fully opened valve position in a hydraulically dampened fashion. Finally, the pressure fluid volume compressed in the magnet armature due to the opening movement of the valve member also contributes to increasing the pressing force on the sealing lip of the sealing element, thereby boosting the damper effect.

The embodiments of the present invention which will be illustrated and explained in the following detailed description disclose further features and advantages of the present invention with reference to the accompanying drawing.

BRIEF DESCRIPTION OF THE DRAWING

The FIGURE shows a cross-section taken through a solenoid valve.

DETAILED DESCRIPTION OF A PREFERRED EMBODIMENT

A solenoid valve, when electromagnetically de-energized as shown in the FIGURE is in its open basic position. A valve housing 1 has the shape of a valve sleeve and is fixed to valve-accommodating member 2. The solenoid valve is shown in a considerably enlarged view. Valve housing 1 is a sleeve-shaped part with dimensions of a few millimeters only. Valve-accommodating member 2 can be made of steel alloy. Valve housing 1, configured as a valve sleeve, is deep drawn from nonmagnetic rustproof steel. Valve housing 1 accommodates in the hollow space of the magnet armature 5 a valve needle 6 acting as a closure member. Valve needle 6 extends concentrically through the magnetic core 7. In a stepped bore of the magnetic core 7, a compression spring 8 is coaxially arranged with respect to the magnet armature 5 and is slipped over the valve needle 6 to abut on the end surface of the magnet armature 5. In the area of the pressure fluid inlet duct 9 provided in the valve-accommodating member 2, the valve seat 11 is retained by staking it in a stepped housing bore 10 inside the valve-accommodating member 2. Further, a magnet coil 14 is fixed on the valve dome of valve housing 1 by way of grip screw 13.

Especially when rustproof steel is used, the deep drawing process to manufacture the valve sleeve (valve housing 1) results in cold-work hardening so that a high-pressure resistant valve housing 1 is manufactured, while efficiency of the magnetic circuit in response to the thin wall dimensions of the valve sleeve is ensured. Because the interior of the valve sleeve is totally exposed to high pressure when application of the solenoid valve is in hydraulic brake systems, the previously described method of manufacture and fixation of the valve sleeve is extremely favorable. The interior of the valve housing 1 is subdivided into two pressure fluid chambers 4, 12 by a sealing element 3 fitted on the end portion of the magnet armature 5 that is at the top in the drawing. Pressure fluid chambers 4, 12 are hydraulically interconnected by way of an orifice 16 arranged in the magnet armature 5. Orifice 16 is introduced laterally into the magnet armature 5, below the sealing element 3, so that the orifice bore, vertically to the armature's axis, establishes a connection to the pressure fluid chamber 4. The sealing element 3 has the shape of an annular cup performing the function of a non-return valve. To fasten the sealing element 3, the magnet armature 5 has a collar 17 which includes a conical constriction in the direction of the valve needle 6. The conical portion of the magnet armature 5 ensures the reliable seat of the sealing element 3. Thus, the sealing element 3, along the wall of the valve dome, defines the pressure fluid chamber 4 which extends up to the magnet armature bore, and the external pressure fluid chamber 12 which extends along the longitudinal groove 18. The pressure fluid chamber 12, which extends up to the housing bore 10, is connected to the pressure fluid chamber 4 through the bore of orifice 16 which extends radially through the magnet armature 5. To this end, the magnet armature 5 has a longitudinal groove 18 along its outside contour. In addition to the effect of the orifice 16, the function of the sealing element 3 as a non-return valve renders possible a pressure fluid connection from the pressure fluid chamber 12 to the pressure fluid chamber 4 exclusively during movement of the valve needle 6 in the closing direction.

To ensure the fixation of the valve sleeve (valve housing 1) inside the valve-accommodating member 2 under the action of maximum operating pressures, the peripheral surface of the valve sleeve in its conical area is fixed in a frictionally and, if necessary, also positively engaged fashion between the contact surfaces of the magnetic core 7 and the valve-accommodating member 2. The fixation is by calking an annularly circumferential nose 15 on the valve-accommodating member 2, whereby the thin-walled valve sleeve is adapted to the surface contour of the magnetic core 7 that is inserted in the valve accommodating member 2. Under the action of increased pushing forces, due to increased inner pressures, the calking arrangement prevents the leakage of fluid, on the one hand, and a possible disengagement of the valve sleeve from its fixation, on the other hand.

The operation of the present invention will be explained in the following.

In the drawing, the valve needle 6 in its open position establishes a hydraulic connection between the pressure fluid inlet duct 9 and the pressure fluid outlet duct 19. In the special application for a slip-controlled hydraulic brake system, the pressure fluid supply means, i.e., the braking pressure generator or the auxiliary pressure source, is connected to the pressure fluid inlet duct 9, and the consumer, i.e., the wheel brake, is connected to the pressure fluid outlet duct 19. The magnet armature 5 is not energized electromagnetically so that the compression spring 8 interposed between the magnetic core 7 and the magnet armature 5 retains the magnet armature 5 in abutment with the valve dome. The pressure fluid prevailing in the housing bore 10 propagates simultaneously through the pressure fluid chamber 12, disposed outside the magnet armature 5, and through the longitudinal groove 18 up to the orifice 16 and the sealing element 3, respectively, so that the pressure in the housing bore 10 is also applied to the pressure fluid chamber 4 in the magnet armature 5.

When the valve is energized electromagnetically, the magnet armature 5 moves downward in the direction of the magnetic core 7. The result is an increase of the pressure fluid chamber 4 in the valve dome and axial movement of the sealing lip 20 of the sealing element 3, provided as an annular cup, along the inside wall of the valve housing 1 only by a negligibly small preloading force. The friction forces on the sealing element 3 are correspondingly low so that the valve closing movement is not impaired.

In the absence of electric current flow through the magnet coil 14, the direction of movement of the magnet armature 5 will be reversed so that, during the opening movement of the valve needle 6, the fluid compressed in the pressure fluid chamber 4 of the valve dome can be displaced in the direction of the pressure chamber 12, which is arranged outside the magnet armature 5, in a manner delayed by the rate of fluid flow through the orifice 16. In this arrangement, the sealing lip 20 is urged by the hydraulic pilot pressure in the valve dome against the inside wall of the valve sleeve to provide large surface sealing, thereby delaying the opening movement to the extent desired. Consequently, the opening speed of the valve needle 6 is determined to a major degree by the choice of the size of orifice 16 and the thereby influenced cup friction on the valve housing 1. The use of the orifice 16 permits governing the hydraulic resistance so that temperature or viscosity variations will not greatly influence the opening speed of the valve needle.

In particular when the object of the present invention is used in slip-controlled brake systems, the defined dampening of the valve opening stroke permits achieving braking pressure control which is especially precisely adjustable, and a reduction of the noise of abutment of the magnet armature on the valve dome in the end position. Because the armature stroke is relatively small, the sealing element 3 must have a sufficiently rigid design to minimize the deformation of the sealing element during fluid volume variations in the pressure chamber 4. A suitable material for the sealing element is Teflon (PTFE) which has a resistance to wear and sliding properties as desired.

The reduction of switching noises is of particular importance in the above-mentioned slip-controlled hydraulic brake systems when solenoid valves which are electromagnetically deenergized in their open basic position (so-called normally open inlet valves) are used because the hydraulic difference in pressure on the inlet valve, i.e., between braking pressure consumer and braking pressure supply means, is considerably greater than that in the solenoid valve which is closed in its electromagnetically deenergized state (so-called normally closed outlet valve), wherein the consumer pressure (braking pressure) is discharged to approach atmospheric pressure in approximation. In addition, with increasing difference in pressure on the inlet valve and maintaining a constant on-cycle of the exciter current (pulse length), the valve opening time becomes longer, which results in major pressure variations and, thus, increased noises in valves of a conventional type of construction.

However, the present invention is not limited to the embodiment described and, therefore, can also be used, if necessary, for valves which are electromagnetically deenergized in their closed position. In consideration of the preceding suggestions of the present invention, the one skilled in the art is free to use the non-return valve function of the sealing element in the one or the other direction of stroke of the magnet armature in order to achieve the desired effect. Thus, other embodiments are possible in this respect which need not be explained in detail, however.

We claim:

1. A solenoid valve for slip-controlled hydraulic brake systems, comprising:

a valve housing defining a closed interior space accommodating a plurality of valve component parts defining the function of the solenoid valve;

a valve needle fixed to a magnet armature slidably disposed in the valve housing;

a magnetic core fixed in the valve housing;

a valve seat operably engaged by the valve needle in a closed position;

a magnet coil circumscribing the valve housing displacing the magnet armature and the valve needle between the closed position and an open position;

a valve accommodating member in which the valve seat is located having an inlet duct and an outlet duct separated by the valve seat;

the valve seat having an aperture blocked by the valve needle in the closed position;

a unidirectional sealing element interposed between an outside periphery of the magnet armature and an outside periphery of the valve housing separating a first pressure chamber from a second pressure chamber wherein the first pressure chamber is disposed between the armature and a first end of the valve housing and the second pressure chamber is disposed outside the periphery of the magnet armature opposite the sealing element from the first pressure chamber; and the armature magnet having an orifice fluidly connecting the first pressure chamber to the second pressure chamber, wherein the sealing element in one of the two directions of movement of the magnet armature establishes an almost unhindered hydraulic connection between the first pressure chamber and the second pressure chamber.

2. A solenoid valve as claimed in claim 1, wherein the sealing element is fixed to the outside periphery of the magnet armature and the sealing element has a sealing lip moveable in to and out of engagement with the valve housing.

3. A solenoid valve as claimed in claim 1, wherein the sealing lip is configured to provide a constant preloading force against the valve housing and the preloading force can be increased and decreased by a difference in pressure between the first and the second pressure chambers resultantly varying a friction force between the sealing element which is fixed to the armature magnet and the valve housing which is engaged by the sealing lip with the variation in friction force in turn influencing the lifting speed of the magnet armature.

4. A solenoid valve as claimed in claim 3, wherein the additional force produced by the difference in pressure between the two pressure chambers is determined by the size of the orifice.

5. A solenoid valve as claimed in claim 3, wherein the sealing element is oriented so that the friction force provided between the sealing lip and the valve housing is a minimum in the direction of the closing movement of the valve needle and a pressure fluid passage is constituted between the sealing lip and the valve housing with fluid flow there between during the valve closing movement to fluidly connect the first pressure chamber with the second pressure chamber.

6. A solenoid valve as claimed in claim 1 wherein the sealing element is oriented so that a friction force provided between a sealing lip of the sealing element and the valve housing is a maximum in the direction of the opening movement of the valve needle, a pressure of the fluid in the first pressure chamber pressing the sealing lip against the valve housing depending on the rate of hydraulic flow through the orifice.

7. A solenoid valve as claimed in claim 6, wherein the size of the orifice is sufficiently small to slow movement of the valve needle from the seat.

8. A solenoid valve as claimed in claim 1, wherein the sealing element is configured to be relatively rigid when in engagement with the valve housing to minimize any change in shape of the sealing element relative to changes in fluid volume in the first pressure chamber responsive to the magnet armature stroke.

9. A solenoid valve as claimed in claim 8, wherein the sealing element is made of Teflon.

* * * * *